United States Patent
Jothilingam et al.

(10) Patent No.: US 11,581,971 B2
(45) Date of Patent: Feb. 14, 2023

(54) DOCSIS CLOCK EMULATION IN DISTRIBUTED ACCESS ARCHITECTURES

(71) Applicant: ARRIS Enterprises LLC, Suwanee, GA (US)

(72) Inventors: Vasudevan Jothilingam, Bangalore (IN); Kumara Swamy Tadikavagilu Venkatappa, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/359,086

(22) Filed: Jun. 25, 2021

(65) Prior Publication Data

US 2022/0006545 A1 Jan. 6, 2022

(30) Foreign Application Priority Data

Jul. 6, 2020 (IN) .............................. 202031028744

(51) Int. Cl.
*H04J 3/06* (2006.01)
*H04L 12/28* (2006.01)
*H04L 69/28* (2022.01)

(52) U.S. Cl.
CPC .......... *H04J 3/0641* (2013.01); *H04J 3/0644* (2013.01); *H04J 3/0667* (2013.01); *H04L 12/2801* (2013.01); *H04L 69/28* (2013.01)

(58) Field of Classification Search
CPC .... H04L 47/12; H04L 12/2801; H04J 3/0673; H04J 3/0667; H04J 3/0658; H04J 3/0644; H04J 3/0641
See application file for complete search history.

(56) References Cited

U.S. PATENT DOCUMENTS

| | | | |
|---|---|---|---|
| 9,692,563 B2* | 6/2017 | Liu ..................... | H04L 27/3405 |
| 2011/0161701 A1 | 6/2011 | Blixt et al. | |
| 2014/0314193 A1* | 10/2014 | Sung ....................... | H04L 7/042 |
| | | | 375/376 |
| 2015/0295669 A1* | 10/2015 | Chapman .............. | H04L 27/345 |
| | | | 370/503 |
| 2016/0112182 A1 | 4/2016 | Karnes | |
| 2020/0343988 A1* | 10/2020 | Nandiraju ............. | H04J 3/0661 |

OTHER PUBLICATIONS

Charles Cook, "DOCSIS Time Protocol and Support of Wireless Access", Broadband Library, 2022 (Year: 2022).*
DVB Organization: "CM-SP-R-DTI-101-150615.pdf", DVB Digital Video Broadcasting, C/O EBU—17A Ancienne Route—CH-1218 Grand Saconnex, Geneva—Switzerland, Jun. 15, 2015 (Jun. 15, 2015), XP017847414, p. 33, paragraph 6.1—p. 34, paragraph 6.1.3.2.
International Search Report and Written Opinion RE: Application No. PCT/US2021/039198, dated Nov. 25, 2021.

* cited by examiner

*Primary Examiner* — Omer S Mian
(74) *Attorney, Agent, or Firm* — Chernoff, Vilhauer, McClung & Stenzel, LLP

(57) ABSTRACT

Systems and methods for implementing a software emulation of a clock calibrated by the software based on sampling a hardware clock.

33 Claims, 3 Drawing Sheets

DOCSIS CLOCK EMULATION IN DISTRIBUTED ACCESS ARCHITECTURES

CROSS REFERENCE TO RELATED APPLICATIONS

This application claims priority to India patent application serial number 202031028744 filed Jul. 6, 2020.

BACKGROUND

The subject matter of this application generally relates to timing mechanisms for clocks in an R-PHY transmission network.

Although Cable Television (CATV) networks originally delivered television content to subscribers over large distances using an exclusively RF transmission system, modern CATV transmission systems have replaced much of the RF transmission path from a provider's head end to a subscriber's premises with a more effective optical network, creating a hybrid transmission system where cable content is transmitted over the bulk of the distance between the head and the subscriber using optical signals, but terminates as RF signals over coaxial cables.

Historically, the head end also included a Cable Modem Termination System (CMTS), used to provide high speed data services such as video, cable Internet, Voice over Internet Protocol, etc. Typically, a CMTS will include both Ethernet interfaces (or other more traditional high-speed data interfaces) as well as RF interfaces so that traffic that is coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern HFC CATV systems have combined the functionality of the CMTS with the television delivery system (EdgeQAM) in a single platform called the Converged Cable Access Platform (CCAP).

As networks have expanded and head ends have accordingly become increasingly congested with equipment, many content providers have recently used distributed architectures to spread the functionality of the CMTS/CCAP throughout the network. This distributed architecture keeps the data and video signals in digital format as long as possible, extending the digital signals beyond the CMTS/CCAP deep into the network before converting them to RF. It does so by replacing the analog links between the head end and the access network with a digital fiber (Ethernet/PON) connection.

One such distributed architecture is the Remote PHY (R-PHY) distributed access architecture, which relocates the physical layer (PHY) of a traditional CMTS or CCAP by pushing it to the network's fiber nodes. Thus, while the core in the CMTS/CCAP performs the higher layer processing, the R-PHY device in the node converts the downstream data sent by the core from digital to analog to be transmitted on radio frequency, and converts the upstream RF data sent by cable modems from analog to digital format to be transmitted optically to the core.

Once the functionality of the CMTS/CCAP is divided between a core in the head end and various PHY devices throughout the network, however, protocols must be established to properly synchronize the clocks in the core with those in the PHY devices, and this is typically accomplished using sync messages under the Precision Timing Protocol (PTP). Moreover, an R-PHY network transmits information according to the Data over Cable Service Interface Specification (DOCSIS), where behavior of various components must be scheduled and/or coordinated, such as when various cable modems are each assigned their own respective time slots to send upstream transmissions. to a CCAP. However, the PTP protocol synchronizes hardware to a 204.8 MHz clock, which the DOCSIS standard communicates in software using a 10.24 MHz clock. This timing discrepancy is often problematical since the higher-frequency hardware clock must be converted to a lower frequency to conform to DOCSIS protocols.

What is therefore desired are improved systems and methods for deriving DOCSIS timing information in an R-PHY network.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

For purposes of the disclosure and the claims, the following terms are defined to as to more easily understand the subject matter described and claimed:

Master Clock: a clock that sends timing information to a slave clock for that clock to synchronize its time to that of the master clock.

Slave Clock: a clock that receives timing information from a master clock to synchronize its time to that of the master clock.

Grandmaster Clock: a clock that only operates as a master clock and is the source of time to the packet network:

Ordinary clock: a slave clock that has a single port receiving timing information from a master clock.

Boundary Clock: a clock that operates as both a slave and a master by having one port in a slave state receiving time from a master clock, and one or more ports in a master state which disseminate timing information to downstream slaves.

Figure 1:
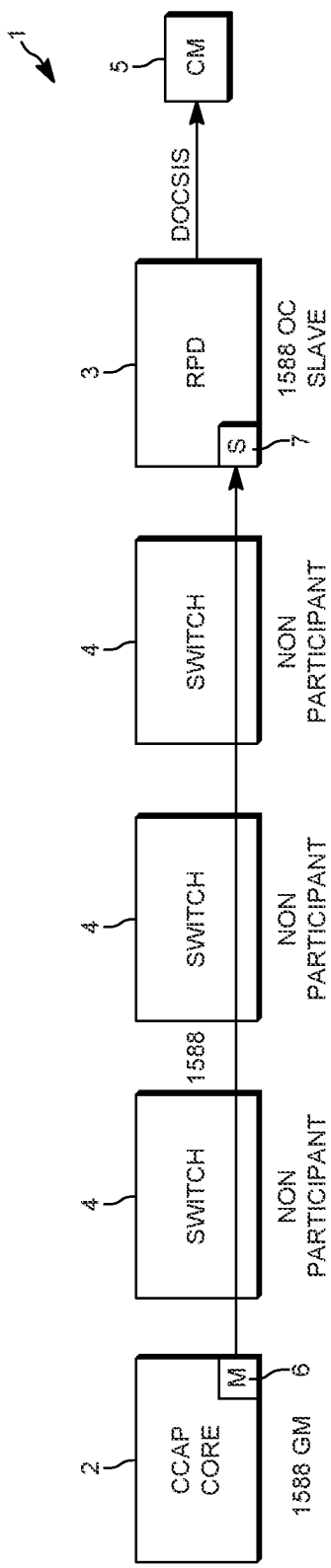
FIG. 1 shows an exemplary timing arrangement for an R-PHY system where a CCAP core is used as timing grandmaster and Remote PHY Devices (RPDs) are the timing slaves.

As already noted, in R-PHY systems the clocks of the Remote PHY Devices (RPDs) and the CCAP core must be synchronized for time scheduling of data transfers to work properly, and this synchronization must not only be of frequency, but also of phase. Referring to FIG. 1, for example, a first topology 1 may include a CCAP core 2 synchronized with an RPD 3 connected together via a plurality of network switches 4. The RPD 3 is in turn connected to one or more cable modems 5. Synchronization is attained by a grandmaster clock 6 in the core 2 which sends timing information to a slave clock 7 in the RPD 3. Those of ordinary skill in the art will appreciate that, although FIG. 1 shows only one RPD 3 connected to the core 2, many such RPDs may be simultaneously connected to the core 2, with each RPD having a slave clock 7 receiving timing information from the grandmaster clock 6 in the core.

Figure 2:
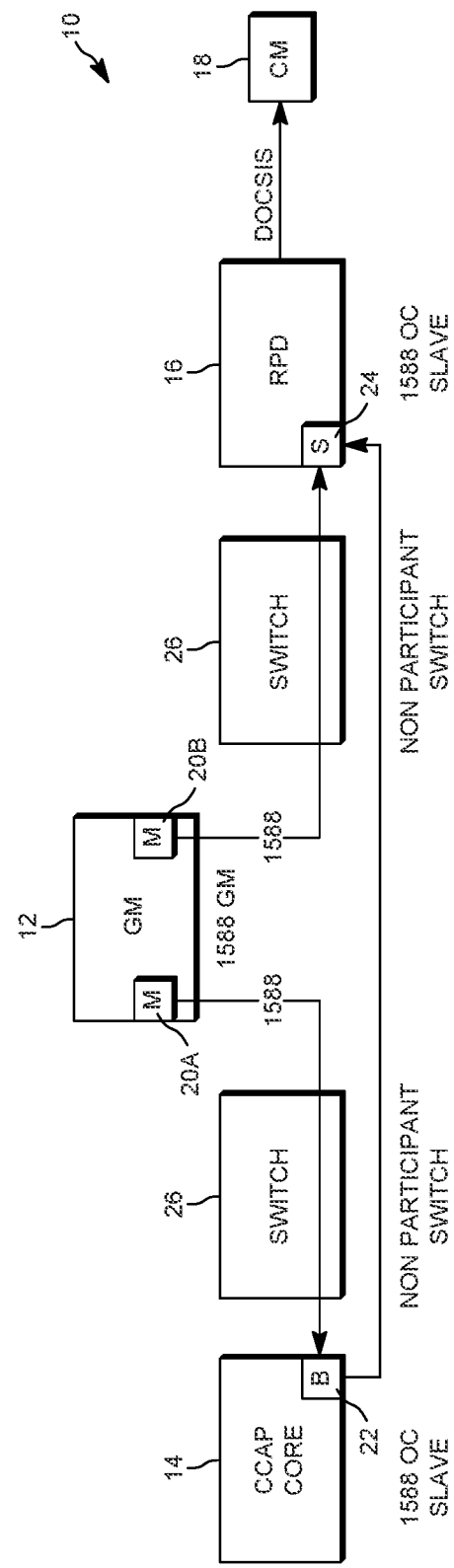
FIG. 2 shows an exemplary timing arrangement for an R-PHY system where both a CCAP core and its RPDs are timing slaves to an external grandmaster clock (GM).

FIG. 2 shows a second topology 10 to provide synchronization between a CCAP core 14 and an RPD 16, which again is connected to one or more cable modems 18. Unlike the system of FIG. 1, however, a separate timing grandmaster device 12 provides timing information to both the CCAP core 14 and the RPD 16. Specifically, the timing grandmaster 12 has a first master port 20a connected to a boundary clock 22 in the CCAP core 14 and a second master port 20b connected to a slave clock 24 in the RPD 16. The boundary clock 24 may therefore be a slave to the grandmaster 12 but a master to the slave clock 24 in the RPD. Those of ordinary skill in the art will recognize that the respective clocks of the CCAP core 14 and the RPD 16 may both be connected to a single master port in the timing grandmaster device 12, and the use of separate timing ports 20a and 20b in FIG. 2 is used merely to more easily describe the separate timing processes. The CCAP core 14 may be connected to the timing grandmaster 12 through one or more switches 26 while the RPD 16 may be connected to the timing grandmaster 12 through one or more switches 26. Again, those of ordinary skill in the art will appreciate that, although FIG. 2 shows only one RPD 16 connected to the timing grandmaster 12, many such RPDs may be simultaneously connected to the grandmaster 12, with each RPD having a slave clock 24 receiving timing information from a port 20b in the grandmaster clock 12. Due to common performance issues in the CCAP core, the topology 10 shown in FIG. 2 is usually more reliable than that shown in FIG. 1.

The CCAP core 14 operates as a Medium Access Control (MAC) layer in an R-PHY system while the RPD 16 is the physical (PHY) device that performs the physical layer processing, such as QAM-modulating a variety of different content received over an IP packet-based network so that a downstream set top box (STB) may receive respectively desired content by tuning to a particular channel. In a CATV system, the user equipment such an STB or a cable modem should be unaware of whether the system it is connected to is an integrated or a distributed architecture, meaning that the R-PHY system must operate as if it were an integrated architecture where both the MAC and PHY layers were collocated in a single head end. For this to occur, the operation of the MAC layer in the CCAP core 12 and the PHY layer in the RPD 16 must be precisely synchronized. To this end, the Precision Timing Protocol (PTP), and other such timing protocols, have been promulgated to provide for such synchronization. PTP specifically is providing timing synchronization using a 204.8 MHz clock. PTP utilizes hardware time stamps to ensure devices are synchronized, where the hardware that performs the time stamps is dedicated to synchronization. Therefore, PTP networks have much sharper time resolutions than software-based timing protocols and furthermore will timestamp the amount of time that synchronization messages spend in each device, which accounts for device latency.

The software data plane (or packet forwarding module) of an R-PHY system, however, uses a 10.24 MHz DOCSIS clock to implement DOCSIS timing-related activities, such as downstream channel scheduling for transmitting packets, time-stamping SYNC and PLC packets, and PCR re-stamping for video. Because, however, the hardware Field-Programmable Gate Array (FPGA) clock is locked to PTP time stamps that implement a 204.8 MHz clock, the software data plane must convert that 204.8 MHz clock to a 10.24 MHz DOCSIS clock.

Sampling the FPGA clock is often costly and may introduce latency, which adversely impacts clock accuracy. For example, the necessity to access the hardware introduces latency given the time needed to access the memory registers containing the timing information. Also, if the R-PHY system uses multiple CPU cores in bare metal mode for the software data plane, and each core operates on a 10.24 MHz clock, each core will attempt to access the same registers/shared memory, which results in contention to access the FPGA among the cores to read the FPGA clock, introducing random delays as FPGA reads must be queued during periods of contention. Such contention occurs frequently because each core must access the hardware clock at a high rate. These issues together reduce the packet forwarding rate of the CPU in the RPD 16 because the CPU must take time reading the hardware clock and/or waiting in a queue.

Figure 3:
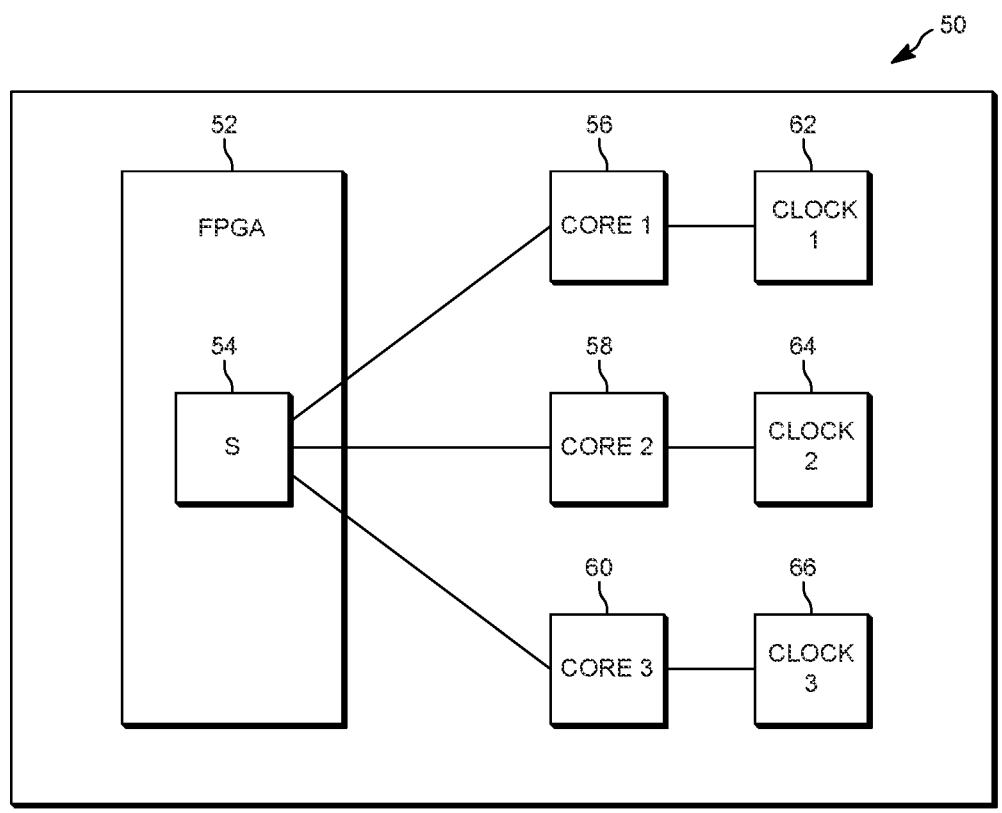
FIG. 3 shows an exemplary RPD that operates one or more emulated DOCSIS clocks.

FIG. 3 shows an exemplary RPD 50 that implements a novel emulated DOCSIS clock. Though FIG. 3 shows an exemplary RPD, those of ordinary skill in the art will appreciate that other devices in a distributed access architecture (DAA) may also utilize the disclosed emulated DOCSIS clock, such as a Remote ONU, a Remote OLT, an amplifier, or any other DAA device that uses PTP timing information to determine DOCSIS timing information.

The RPD 50 may include an FPGA 52 or other such hardware device that includes a clock 54 that receives PTP sync messages from a master or grandmaster clock in a communications network. The clock 54 may operate on a relatively high frequency, such as 204.8 MHz as specified in the PTP protocol. The RPD 50 may also include one or more processing cores, such as cores 56, 58, and 60 which perform data plane software processing for the communications network using timing information of a relatively low frequency, such as a 10.24 MHz frequency specified by the DOCSIS standard. Each of the one or more cores 56, 58, and 60 also preferably implement a respective emulated DOCSIS clock 62, 64, 66 at the relatively low frequency, e.g. 10.24 MHz based on timing information from the CPU clocks of the respective cores and timing information from the clock 54 as further specified. Those of ordinary skill in the art will appreciate that, although FIG. 3 shows each core running a separate emulated clock, some architectures may operate a single emulated clock used by each core.

Figure 4:
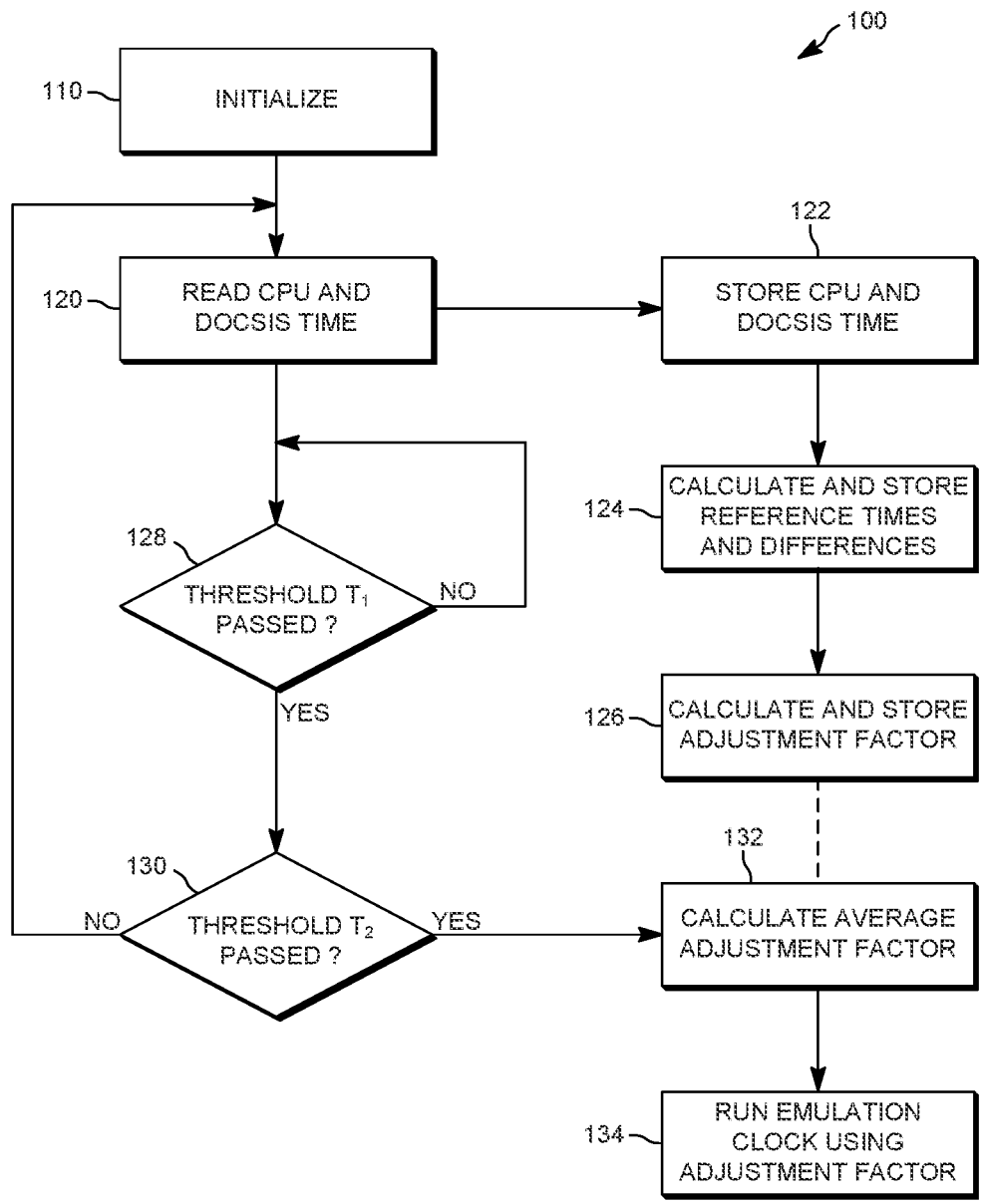
FIG. 4 shows an exemplary method used to calibrate the DOCSIS clock of FIG. 3.

FIG. 4 shows an exemplary method 100 that initializes and runs the emulated clocks 62, 64, and 66 of FIG. 3. At step 110 the system is initialized and at step 120 the system reads both a current CPU time and a relatively low-frequency current emulation time, such as a DOCSIS time, based on the hardware clock 54 that operates on a relatively high frequency, e.g. 204.8 MHz. Assuming, for example, that the hardware clock 54 operates at a 204.8 MHz PTP frequency, and the low-frequency emulation time is a 10.24 MHz frequency specified under the DOCSIS protocol, a current DOCSIS time can be computed from a sample of the clock 54 using the formula current DOCSIS time=current PTP time/20. The sampled CPU time is proportional to the speed of the CPU, which will of course vary based on the internal components of the core(s) 56, 58. 60. For purposes of the remainder of this disclosure, it will be assumed that the relatively low-frequency emulation time is a 10.24 MHz DOCSIS time and that the relatively high-frequency time is a 204.8 MHz PTP time, but those of ordinary skill in the art will understand that the systems and methods disclosed in this specification may be generalized to other frequencies as is appropriate for particular applications.

At step 122, the sampled current CPU time and current DOCSIS time are stored, and in step 124 the initial samples are also stored as a reference CPU time and a reference DOCSIS time, respectively. At step 128, the method waits for a first threshold amount of time to pass before taking another sample. In one disclosed embodiment, the threshold amount of time may be 10 seconds. After this time has elapsed, the method proceeds to step 130 to determine whether a second threshold amount of time has been exceeded, which as disclosed later, represents the amount of time before a sufficient number of samples has been collected to begin running the emulated DOCSIS clock. If the second threshold amount of time has not been reached, the method returns to step 120 and another sample of a current CPU and current DOCSIS time are again stored at step 122. At step 124, where previous reference samples exist, difference values are calculated between the reference values and the current values as follows:

CPUTimeDiff=CurrentCPUTime−RefCPUTime

DOCSISTimeDiff=Current DOCSISTime−RefDOCSIS Time

After these difference values are stored, the current CPU time and the Current DOCSIS time replace the previously stored reference values, respectively for the next iteration.

Then at step 126 an adjustment factor is calculated as the ratio of the DOCSIS time difference over the CPU time difference, and the adjustment value is stored, i.e. the ratio CPUTimeDiff/DOCSISTimeDiff is stored in an array, such that each successive measurement of this ratio over the interval between the first threshold time and the second threshold time reflects a sample of a scaling factor that converts the CPU time to a 10.24 MHz DOCSIS time. As noted earlier, this sample will be affected by a bottleneck delay to access the hardware clock of the FPGA as well as randomly encountered queue delays.

As noted, the disclosed method continues to take such samples until the second threshold time is reached. In one disclosed embodiment, the second threshold time may be one minute, i.e. where the first threshold time is 10 seconds, seven samples of a current CPU and current DOCSIS time are collected, and six difference value pairs are collected as well as six adjustment factors. Then at step 132 an average adjustment factor is calculated. As noted earlier, each sample of the adjustment factor will be affected by a bottleneck delay to access the hardware clock of the FPGA as well as randomly encountered queue delays, but by taking a number of samples and averaging them, a true scaling factor between the CPU time and the desired 10.24 MHz DOCSIS time may be approached with a desired degree of accuracy simply by adjusting the first and second thresholds to acquire more samples. This reflects a trade-off between performance (small number of samples) and accuracy (large number of samples).

Once the desired number of samples have been collected, over the desired interval, at step 134 the emulated DOCSIS clock may be used by the RPD or other device 50. The emulation clock may be implemented by reading a current CPU time and inputting it into the formula Current DOCSISTime=RefDOCSIS time+((CurTime−RefCPUTime)*AvAdj)

where CurTime is the current CPU time and AvAdj is the average adjustment factor calculated in step 132.

In some preferred embodiments, the systems and methods shown in FIGS. 3 and 4 may adjust for changes in the CPU clock over time due to temperature changes or other variables that affect the CPU clock. In such systems, after the emulation clock is in use via the formula recited in the preceding paragraph, the reference DOCSIS time and reference CPU time may be periodically resampled, e.g. every minute or other desired interval.

In some preferred embodiments, the systems and methods shown in FIGS. 3 and 4 may implements configurable parameters for either or both of the first threshold and the second threshold, as well as optionally for the resampling interval used to correct the CPU clock for temperature or other variations.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A device comprising:
a first clock operating in hardware and synchronized to a first frequency;
a second clock operating in software and synchronized to second frequency,
the second clock calibrated by the device using samples measured from the first clock,
where the second clock provides a series of time measurements for use by the device after calibration, and over an interval during which the device does not sample the first clock;
where the second clock is calibrated over a calibration interval during which samples are periodically measured; where at least one of a length of the calibration interval and the rate at which samples are taken over the calibration interval are configurable.

2. The device of claim 1 where the first frequency is based on the Precision Riming Protocol (PTP).

3. The device of claim 1 where the second frequency is based on the Data over Cable Service Interface Specification (DOCSIS) standard.

4. The device of claim 1 where the second clock is calibrated using an adjustment factor that samples a delay in reading the first clock.

5. The device of claim 4 where the adjustment factor is averaged over a number of samples.

6. The device of claim 1 where the device recalibrates the second clock after the interval, and subsequently provides a series of time measurements for use by the device after recalibration, and over a second interval during which the device does not sample the first clock.

7. The device of claim 1 wherein the device is implemented in an Remote PHY Device (RPD) of an Remote PHY (R-PHY) Cable Television (CATV) network.

8. The device of claim 7 where the RPD includes at least one other said device, each device being a respective core of the RPD.

9. A method for emulating a first clock in software running on a core of a CPU, and using a second clock in hardware different from the CPU, the first clock having a frequency less than that of the second clock, the method comprising:
sampling the first clock over a first interval to obtain a first sequence of measurement samples;
using the measurement samples to calibrate the second clock; and
operating the second clock over a second interval without sampling the first clock;
including reading and storing a current CPU time and a current Data over Cable Service Interface Specification (DOCSIS) time, calculating a first difference between the current CPU time and a reference CPU time, and calculating a second difference between the current DOCSIS time and a reference DOCSIS time;
including the step of calculating and storing an array of adjustment factors based on a ratio between the first difference and the second difference.

10. The method of claim 9 where the frequency is based on the Precision Riming Protocol (PTP).

11. The method of claim 9 where the second clock has a frequency based on the DOCSIS standard.

12. The method of claim 9 where the second clock is calibrated using an adjustment factor that samples a delay in reading the first clock.

13. The method of claim 12 where the adjustment factor is averaged over a number of samples.

14. The method of claim 9 including averaging the adjustment factors.

15. The method of claim 9 where at least one of the first interval and the rate at which the first clock is sampled over the first interval are configurable.

16. The method of claim 9 executed in an Remote PHY Device (RPD) of an Remote PHY (R-PHY) Cable Television (CATV) network.

17. A device comprising:
a first clock operating in hardware and synchronized to a first frequency;
a second clock operating in software and synchronized to second frequency, the second clock calibrated by the device using samples measured from the first clock,
where the second clock provides a series of time measurements for use by the device after calibration, and over an interval during which the device does not sample the first clock; wherein said device is implemented in an Remote PHY Device (RPD) of an Remote PHY (R-PHY) Cable Television (CATV) network; where the RPD includes at least one other said device, each device being a respective core of the RPD.

18. The device of claim 17 where the first frequency is based on the Precision Riming Protocol (PTP).

19. The device of claim 17 where the second frequency is based on the Data over Cable Service Interface Specification (DOCSIS) standard.

20. The device of claim 17 where the second clock is calibrated using an adjustment factor that samples a delay in reading the first clock.

21. The device of claim 20 where the adjustment factor is averaged over a number of samples.

22. The device of claim 17 where the second clock is calibrated over a calibration interval during which samples are periodically measured.

23. The device of claim 22 where at least one of a length of the calibration interval and the rate at which samples are taken over the calibration interval are configurable.

24. The device of claim 17 where the device recalibrates the second clock after the interval, and subsequently provides a series of time measurements for use by the device after recalibration, and over a second interval during which the device does not sample the first clock.

25. A method for emulating a first clock in software running on a core of a CPU, and using a second clock in hardware different from the CPU, the first clock having a frequency less than that of the second clock, the method comprising:
sampling the first clock over a first interval to obtain a first sequence of measurement samples;
using the measurement samples to calibrate the second clock; and
operating the second clock over a second interval without sampling the first clock, where at least one of the first interval and the rate at which the first clock is sampled over the first interval are configurable.

26. The method of claim 25 where the frequency is based on the Precision Riming Protocol (PTP).

27. The method of claim 25 where the second clock has a frequency based on the Data over Cable Service Interface Specification (DOCSIS) standard.

28. The method of claim 25 where the second clock is calibrated using an adjustment factor that samples a delay in reading the first clock.

29. The method of claim 28 where the adjustment factor is averaged over a number of samples.

30. The method of claim 25 including reading and storing a current CPU time and a current DOCSIS time, calculating a first difference between the current CPU time and a reference CPU time, and calculating a second difference between the current DOCSIS time and a reference DOCSIS time.

31. The method of claim 30 including the step of calculating and storing an array of adjustment factors based on a ratio between the first difference and the second difference.

32. The method of claim 31 including averaging the adjustment factors.

33. The method of claim 25 executed in an Remote PHY Device (RPD) of an Remote PHY (R-PHY) Cable Television (CATV) network.

* * * * *